United States Patent [19]
Rudolph

[11] Patent Number: 6,009,767
[45] Date of Patent: Jan. 4, 2000

[54] SAME-RPM ROTARY MOTION TO ECCENTRIC ROTARY MOTION CONVERSION

[76] Inventor: Gary Rudolph, Rte. 20, P.O. Box 335, Esperance, N.Y. 12066

[21] Appl. No.: 09/065,821

[22] Filed: Apr. 23, 1998

[51] Int. Cl.[7] .............. F16H 33/10; B24B 7/00
[52] U.S. Cl. .................. 74/86; 451/271; 475/11
[58] Field of Search .................. 74/86; 451/270, 451/271; 471/11

[56] References Cited

U.S. PATENT DOCUMENTS

| | | | |
|---|---|---|---|
| 3,937 | 3/1845 | Zeigler | 451/270 |
| 1,937,459 | 11/1933 | Hill | 451/65 |
| 3,744,941 | 7/1973 | Nestor | 74/86 X |
| 5,355,542 | 10/1994 | Oreck et al. | |

*Primary Examiner*—Allan D. Herrmann
*Attorney, Agent, or Firm*—Jay R. Yablon

[57] ABSTRACT

A device and method to convert ordinary rotary motion of input frequency $\Omega$ into a composite motion with the same primary frequency $\Omega$ plus an eccentric motion at a higher frequency $\omega$ enables a low speed rotary input to drive a higher-speed eccentric motion. A preferred embodiment enables an existing rotary motion machine to be easily adapted to provide compound rotary and eccentric motion.

20 Claims, 7 Drawing Sheets

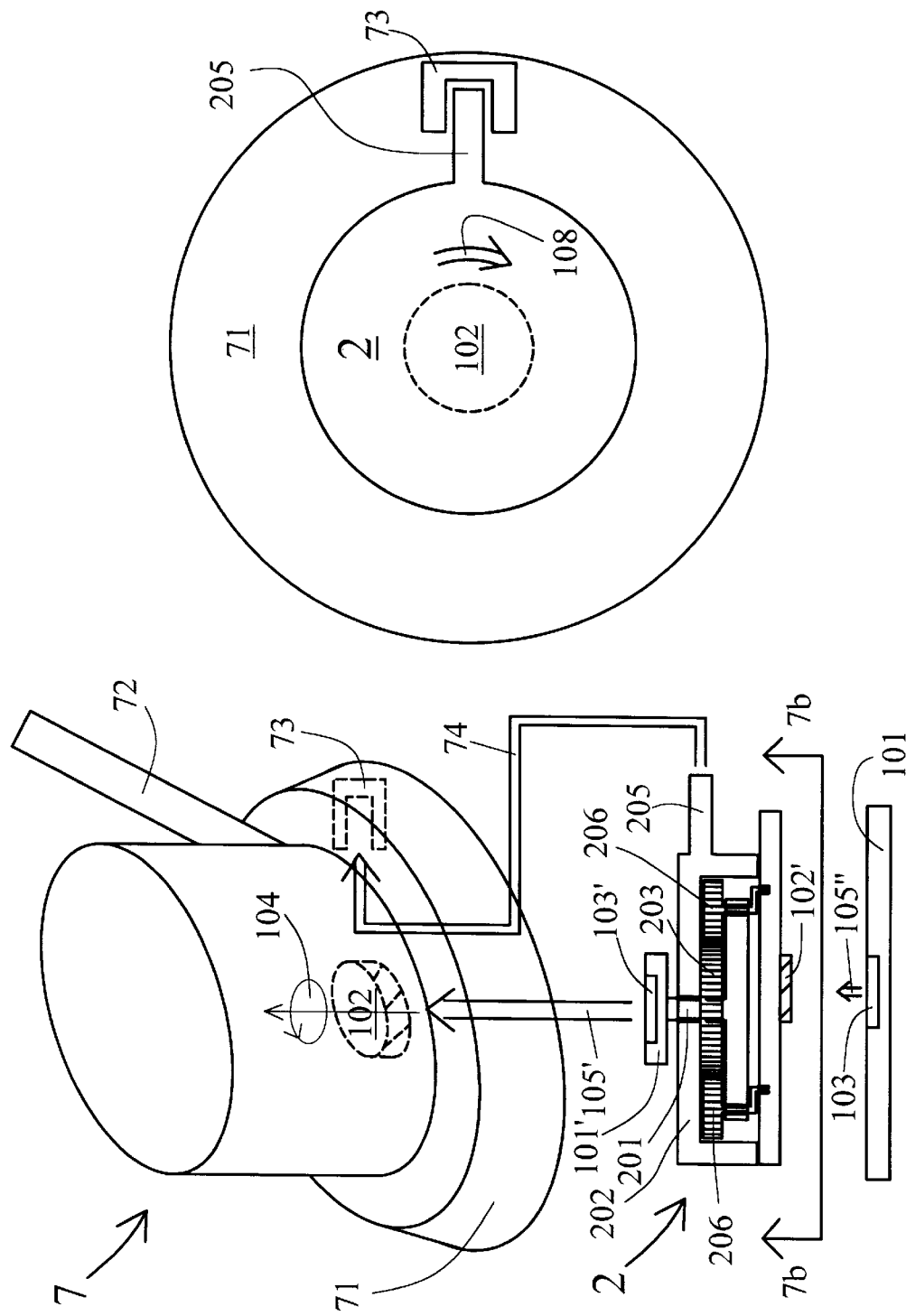

SAME-RPM ROTARY MOTION TO ECCENTRIC ROTARY MOTION CONVERSION

FIELD OF THE INVENTION

This invention relates generally to the field of rotary-motion sanders, polishers, buffers, etc., and specifically to the conversion of rotary motion to eccentric rotary motion without altering the number of revolutions per minute (RPM) of the rotary motion.

BACKGROUND OF THE INVENTION

Conventional generic orbital sanders, buffers and polishers typically drive a sand plate, polishing brush, or sand screen pad at a low speed—typically 175 RPM though sometimes as high as 1000 RPM—in a circular path. This action produces circular scratches on the sanded surface. Other random orbital sanders in existence rely on a high-speed motor to drive an eccentric random action. The action of the high-speed motor is reduced to the desired speed (e.g., 175 RPM) through various mechanical interactions among the gears, shafts, cams, etc. that comprise the sander.

Illustrative of the prior art is U.S. Pat. No. 3,857,206 for a compound-motion machine in which an eccentric shaft (19) rotates about a motor shaft (14) to produce an eccentric rotation, and a secondary motion is produced by a secondary rotation about the axis of the eccentric shaft, using interacting gear wheels (31 and 32). (Column 2, lines 45–57) The eccentric shaft is fixed to, and rotates at the same speed as, the drive shaft. (Column 2, lines 16–20) The motor needed to drive this device must be a high speed motor on the order of 4000 to 6000 RPM (column 2, line 33), which establishes an eccentric rotation at the motor speed (4000 to 6000 rpm), while the secondary rotation about the eccentric shaft is reduced in speed by virtue of the gear wheel interaction, to perhaps 300 or 600 rpm depending on the gear ratio and the motor speed. The net motion is rotation at the lower speed, with eccentric motion at the higher speed, requiring and being driven by a high speed motor. There is nothing disclosing or suggesting how this might be achieved with a low-speed motor, nor is there anything suggesting or disclosing how to convert the ordinary circular motion of an existing machine to such a compound motion, without having to simply replace the machine entirely. U.S. Pat. Nos. 4,322,921, 4,467,565 and 4,845,898 all have similar limitations.

In all of this prior art, an eccentric plate sander is driven by a high-speed (RPM) motor. The eccentric movement is produced directly by the high-speed motor. This high-rotation speed produced by the motor is gear reduced by the gear system into a lower speed rotation. The main drive shaft drives an eccentric drive shaft which in turn drives the gear reduction. This does produce a slow reciprocating action, but requires a high-speed input motor and does not lend itself to adaption to a low-speed input motor. Nor does it enable a pre-existing low-speed machine to be easily adapted to provide high-speed eccentric action.

OBJECTS OF THE INVENTION

It would be desirable to have available a means and method for producing eccentric sanding motion using a low-speed (e.g., 125 to 1000 RPM) input motor in which the speed of rotation of the output is precisely the same as the input speed, and in which gear increment—rather than gear reduction—is used to convert the low-speed input into a higher-speed eccentric movement.

Because many lower-speed input (e.g. 125 to 1000 RPM) sanders are already in use in the market, it would further be desirable to provide a modular attachment for such sanders which converts this lower-speed input into a higher-speed eccentric movement coupled with a rotation identical in speed to the lower-speed input, with minimum use of space and without major modifications to the original buffer, thereby avoiding the need to purchase a separate high-speed input sander in order to achieve this motion and expanding the range of applications that can be performed by a single piece of sanding equipment.

It is further desirable to provide a generic method for converting a lower-speed input of, for example, 175 RPM, into a rotary motion still operating at the example input speed of 175 RPM, but adding eccentric motion at a higher frequency.

It is further desirable for this method to be applied to other rotating sanding devices in existence such as floor sanding edgers, milling machines, and other low speed grinders, as well as hand drill and other rotary motion devices.

SUMMARY OF THE INVENTION

This invention uses a low-speed motor input (frequency) to drive a low-speed rotation at the same speed as the motor input, and through gear increment, to drive a much higher-speed eccentric movement. In the prior art, a high-speed motor input is used to drive a similar high-speed eccentric movement, and through gear reduction, a much lower-speed rotation.

First, an fixed gear housing of the device is fixed to a fixed (non-rotating) component of a rotary motion machine. Second, a drive shaft of the device is affixed to that component of the rotary motion machine which generates rotary motion of the given input frequency. Through various combinations of gear interactions and secondary (eccentric) motion driving bars, the device adds a higher-frequency eccentric oscillation to the original rotary motion. The net output is a primary rotational motion at the original input frequency, and a secondary eccentric oscillation of substantially higher frequency.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

FIG. 7a illustrates a side perspective view of a rotary-motion sanding machine, a side plan view of the invention, and the manner in which the invention (all embodiments) is connected to the sanding machine for use.

FIG. 7b is a bottom-up plan view along the lines 7b—7b of FIG. 7a, of the manner in which the invention (all embodiments) is connected to the sanding machine for use.

DETAILED DESCRIPTION OF THE PREFERRED EMBODIMENT OF THE INVENTION

Figure 1:
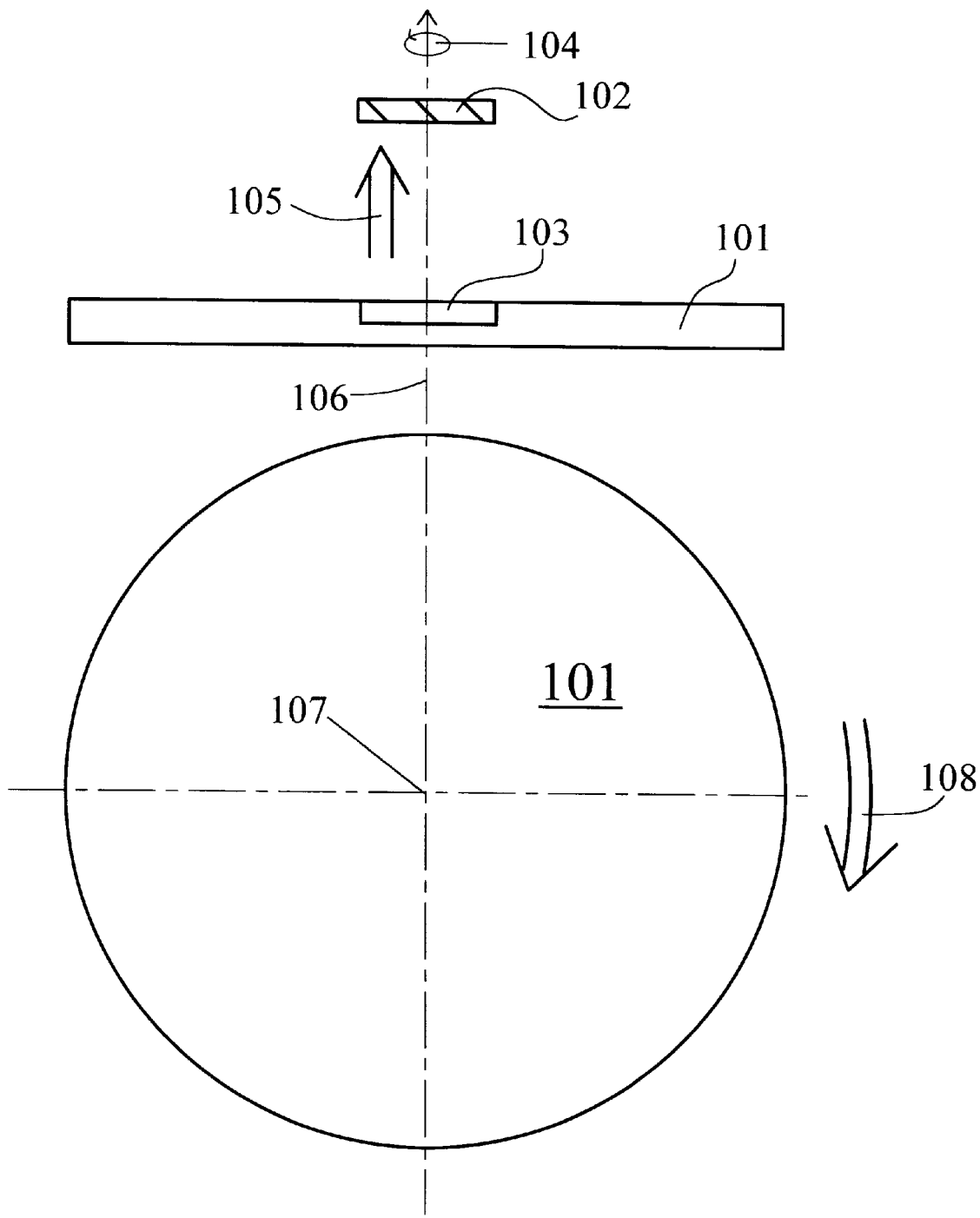
FIG. 1 shows cross-sectional side and bottom-up plan views of the manner in which a sanding, polishing or buffing disk is ordinarily attached to the drive clutch of a rotary-motion sanding machine, in the prior art.

FIG. 1 shows how a sanding, polishing or buffing disk is ordinarily attached to the rotary motion component 102 such as the drive clutch of a rotary-motion sanding machine 7 of FIG. 7a, in the prior art. As shown in cross-sectional side view in the upper part of FIG. 1, conventional rotary sanding machines are set up for sanding, buffing or polishing by attaching (mating) a sanding, buffing or polishing disk attachment (henceforth referred to as operating attachment 101) to input rotary motion component 102 of the sander, by inserting input rotary motion component 102 into an attachment receptacle 103 of operating attachment 101 as shown by arrow 105. Often, the mating proceeds by first inserting input rotary motion component 102 into attachment receptacle 103 and then twisting one relative to the other until they lock together. This manner of mating, and its variations, are well known in the art and so needn't be elaborated herein. Attachment receptacle 103 inserts firmly around input rotary motion component 102 as known in the art so that when the sanding machine 7 is activated, input rotary motion component 102 will begin to rotate at the input speed (RPM) of the sanding machine motor along the direction indicated by (right-hand rule) arrows 104. (Of course, left-hand motion is equally encompassed.) Thus, by virtue of this mating, the entire operating attachment 101 will similarly rotate concentrically at this same motor input speed, as shown from bottom-up view by arrow 108 illustrating the primary orbital motion direction. Also illustrated is a primary rotational center line 106, and operating attachment center 107.

Figure 2:
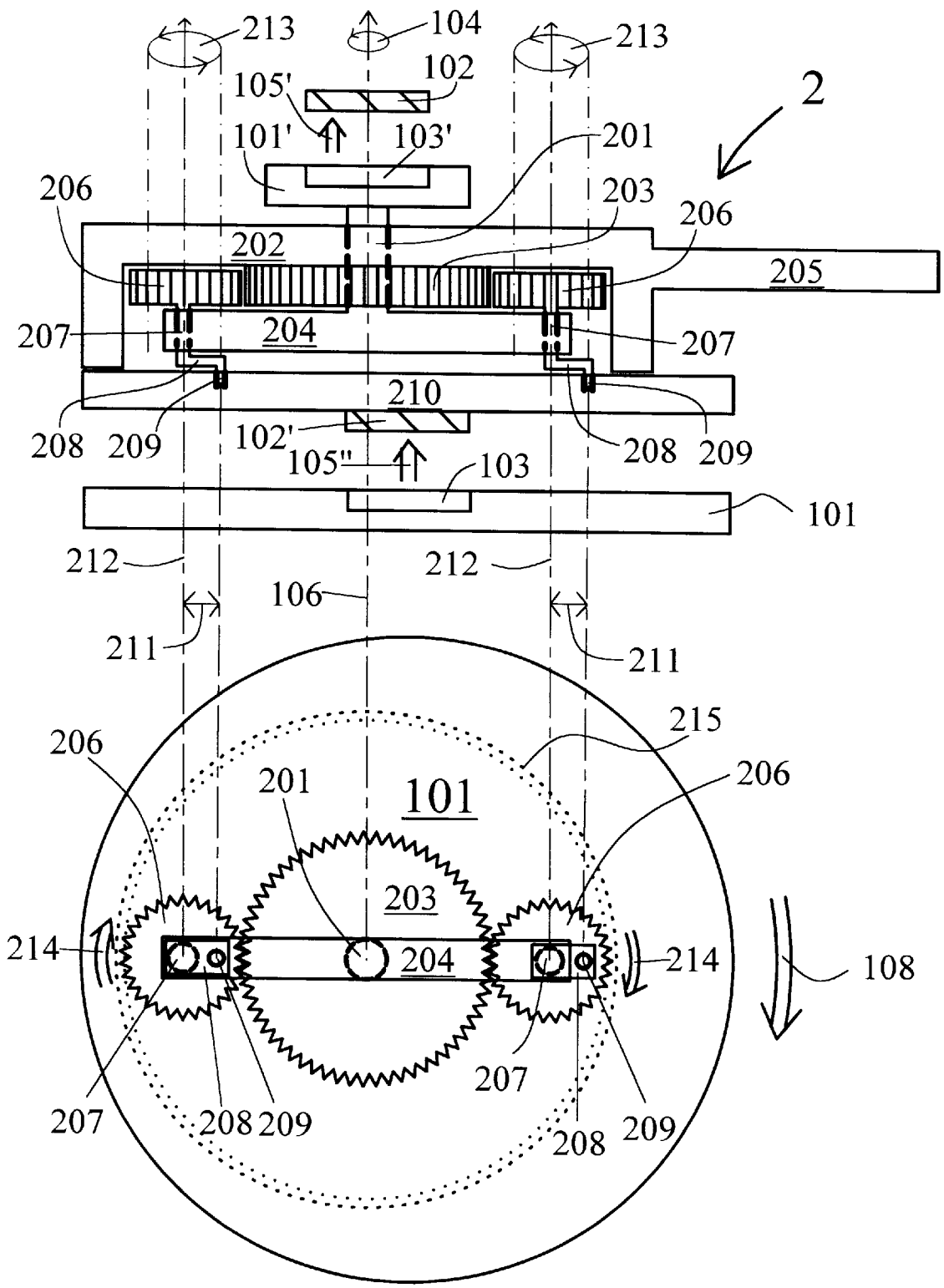
FIG. 2 shows cross-sectional side and bottom-up plan views of the preferred embodiment of the invention, using two moving gears.

FIG. 2 illustrates the preferred embodiment of the invention. Note that the use of "primes" in the component numbering will be used to denote analogous structure and/or function to the prior art structures and/or functions as illustrated in FIG. 1. Rotary-motion conversion module 2 attaches (mates) to input rotary motion component 102 via a conversion module receptacle 103' which is substantially identical to attachment receptacle 103, and which mates to input rotary motion component 102 as shown by arrows 105' in a manner substantially identical to the mating earlier described in FIG. 1 between input rotary motion component 102 and attachment receptacle 103 according to arrows 105. Thus, a shaft driving disk 101' which occupies the same position with respect to input rotary motion component 102 as operating attachment 101 of FIG. 1 will be caused to rotate according to arrows 104 once the sanding machine 7 is turned on.

Operating attachment 101, on the other hand, attaches (mates) to pass-through rotary motion component means 102' of conversion module 2, which is substantially identical in structure to input rotary motion component 102. Similarly, the method of mating attachment receptacle 103 to pass-through rotary motion component 102' according to arrows 105" is substantially identical to the method of mating conversion module receptacle 103' to input rotary motion component 102 according to arrows 105', and to the prior art method of mating attachment receptacle 103 to input rotary motion component 102 according to arrows 105 as in FIG. 1. Because a variety of such mating methods are known in the prior art, this disclosure and its associated claims are intended to fully encompass this variety of mating methods as used within the scope of this invention, and is not dependent on any one or another of these mating methods. However, while shaft driving disk 101' rotates concentrically about primary center line 106 at the input frequency (RPM) of the sanding device motor, operating attachment 101 does not follow this same concentric rotation. Rather, due to the motion-conversion mechanism to be described below, operating attachment 101 no longer exhibits concentric rotation. Instead, its primary rotation is at the same speed at the input motor, but a secondary, higher-speed eccentric motion is also introduced.

To convert the concentric rotary input motion 104 to an eccentric rotary output motion, shaft driving disk 101' is integrally affixed to a drive shaft 201 which runs substantially through the center of an fixed gear housing 202 and substantially through the center of a non-rotating center gear 203 immovably affixed to fixed gear housing 202. The region above fixed gear housing 202 and center gear 203 in FIG. 2 will be generally referred to as the "input region" of the housing; while the region below housing 202 and center gear 203 will be referred to as the "output region" of the housing. Drive shaft 201 at its lower extremity (in the output region) is further integrally affixed to a lateral driving connector 204 as shown. In this illustration, lateral driving connector 204 is a driving bar extending laterally within fixed gear housing 202 as shown, though other embodiments for lateral driving connector 204 are also possible, as will be shown later. Drive shaft 201 rotates within fixed gear housing 202 and non-rotating center gear 203, with bearings and/or appropriate lubricants provided at the surfaces indicated by thicker drawing lines, to facilitate that rotation.

Fixed gear housing 202, importantly, is fixed so that it does not in any way rotate in response to the rotation of input rotary motion component 102. This is achieved by means of a housing fixing device 205 which in the preferred embodiment is an attachment arm as shown. This arm is fixed to the bell of the sanding machine 7 as shown and later described in more detail in FIGS. 7a and 7b, so as to prevent fixed gear housing 202 from rotating, i.e., to render fixed gear housing 202 independent of the rotation of input rotary motion component 102. For other applications, e.g., to convey the rotary motion of a drill into an eccentric rotary motion, the housing fixing device might affix the housing, e.g., to the drill handle. While implementation may thus vary for different applications and devices, the key point is that fixed gear housing 202 is prevented from rotating by affixing it to a non-rotating component of the machine 7 providing the rotary input motion. Non-rotating center gear 203 similarly does not rotate because it is integrally affixed to fixed gear housing 202. Thus, the rotation of input rotary motion component 102 at a given RPM causes shaft driving disk 101', drive shaft 201 and lateral driving connector 204 to rotate at the same RPM as the input drive, while non-rotating center gear 203 remains fixed with respect to this rotation.

To add eccentric motion, the teeth of a pair of rotating outer gears 206 engage the teeth of non-rotating inner gear 203 as shown. Secondary drive shaft means 207 are integrally affixed to rotating outer gears 206 as shown, so as to rotate with the same frequency as outer gears 206. Secondary drive shafts 207 also pass through and are free to rotate with respect to lateral driving connector 204, with bearings and/or appropriate lubrication provided at the region again illustrated by the thicker lines to facilitate free rotation. Eccentric motion driving bar means 208 are integrally affixed to secondary drive shafts 207, and so also rotate at the same frequency as outer gears 206. Finally, a pair of eccentric motion drive shafts 209 are integrally affixed to secondary driving bars 208, again, so as to also rotate with the same frequency as outer gears 206. The combined means comprising components 206, 207, 208 and 209, which is responsible for introducing the eccentric motion into the system, shall be generally referred to as "eccentric motion generating means."

Eccentric motion drive shafts 209, are in turn tapped into a composite motion pass-through means 210 such as the illustrated disk, allowing free rotational movement of eccentric motion drive shafts 209 within composite motion pass-through means 210, again, with bearings and/or appropriate lubrication at the region illustrated with thicker lines. Pass-through rotary motion component 102' is affixed proximate the center of composite motion pass-through means 210, and so when operating attachment 101 is finally attached to pass-through rotary motion component 102' via rotary motion receptacle 103 as per arrows 105", as described earlier, the motion imparted to operating attachment 101 will be that of composite motion pass-through means 210 and pass-through rotary motion component 102', rather that of input rotary motion component 102.

The eccentric motion is introduced, in particular, by eccentric motion driving bar means 208, and generally by the eccentric motion generating means comprising components 206, 207, 208 and 209. The magnitude of the eccentric motion is directly proportional to the displacements 211 between the center of secondary drive shafts 207 and the center of eccentric motion drive shafts 209. By virtue of the connections outlined above, the rotation 104 of input rotary motion component 102 is imparted directly to lateral driving connector 204 via drive shaft 201 and shaft driving disk 101'. The rotation of lateral driving connector 204 causes secondary drive shafts 207 to rotate (orbit) concentrically about primary centerline 106 along arrow 108, while the interaction between rotating outer gears 206 and non-rotating center gear 203 further causes rotating outer gears 206 to rotate (spin) about secondary rotational centerlines 212 along the path illustrated by (right-hand-rule) arrows 213. From the bottom-up view, the rotation of outer gears 206 about secondary rotational centerlines 212 is as shown by arrows 214. This rotation (spin) of outer gears 206 is further imparted to secondary driving bars 208 and, via eccentric motion drive shafts 209, ultimately to composite motion pass-through means 210, pass-through rotary motion component 102', and operating attachment 101.

In particular, composite motion pass-through means 210, pass-through rotary motion component 102', and operating attachment 101 are imparted a net composite motion that captures both the orbit of rotating outer gears 206 about primary centerline 106 (primary orbital motion 108), and the spin of outer gears 206 about secondary rotational centerlines 212 in combination with the eccentric displacements 211 introduced by eccentric motion driving bars 208 (secondary eccentric motion 214). Note that it is the boring of drive shaft 201 directly through the fixed gear housing 202 and center gear 203 and its rotation therein that serves to impart to operating attachment 101 a primary orbital motion 108 that is identical in speed (RPM) to input motion 104.

If the input frequency (RPM) 104 of the motor is designated by $\Omega$ (e.g. 175 RPM for a typical low-speed sander), then the primary orbital motion will be at precisely this same frequency $\Omega$ because of the manner in which drive shaft 201 passes straight through the center of center gear 203 and causes outer gears 206 to orbit about center gear 203. If the number of teeth upon center gear 203 is designated generally by N (N=61 in FIG. 2), and upon outer gear by n (n=30 in FIG. 2), then the frequency $\omega$ of the secondary eccentric motion will be stepped up by the ratio N/n, i.e., $$\omega = (N/n) \times \Omega, \quad (1)$$

with both rotations (214 and 108) occurring in the same direction. Thus, in the illustration of FIG. 2 (by way of example, not limitation), if $\Omega$=175 RPM clockwise, then $\omega$=61/30×175 RPM≈356 RPM clockwise. Circular path 213 is thus illustrated with two arrows, while path 104 is illustrated with but a single arrow, to denote this step up in frequency (i.e., that 213 is a higher-frequency rotation that 104). For a one gear-interaction system such as that of FIG. 2, the step up in the eccentric frequency over the primary frequency is thus determined generally by the gear ratio N/n, though this step up can be further enhanced through multiple gear interactions, as will be later illustrated in connection with FIG. 6.

To maximize sanding, polishing or buffing variation, it is also desirable to choose the number of teeth on each gear so as to introduce the longest possible time (maximum number of cycles) before a particular "grit" upon operating attachment 101 returns to the same radial and angular location (position). In FIG. 2, starting at a given initial position, it requires n=30 revolutions of outer gears 206 about center gear 203, and, simultaneously, N=61 rotations of outer gears 206 about secondary rotational centerlines 212, before a particular grit returns to its original position. Had N been chosen to be 60, rather than 61, then because 60 is evenly divisible by 30, a given grit would return to precisely the same position with every revolution of outer gears 206 about center gear 203, which is not desirable. Generally, gear ratios should thus be chosen so as to avoid common divisible factors. The use of prime number gear counts is helpful in this regard, as this by definition avoids common (indeed any) divisible factors.

Also, it is possible, alternatively, to replace center gear 203 (which has teeth facing radially-outward) with a gear having teeth facing radially inward, running to the outside of outer gears 206, and engaging the teeth of outer gears 206 along the dotted gear line indicated by 215. In this configuration, outer gears 206 would then spin about secondary center lines 212 in a direction opposite their revolution about primary center line 106. That is, 214 would run opposite 108. This naturally introduces a higher gear gain ratio (N/n), because of the larger circumference of gear 215 compared to gear 203.

Figure 3:
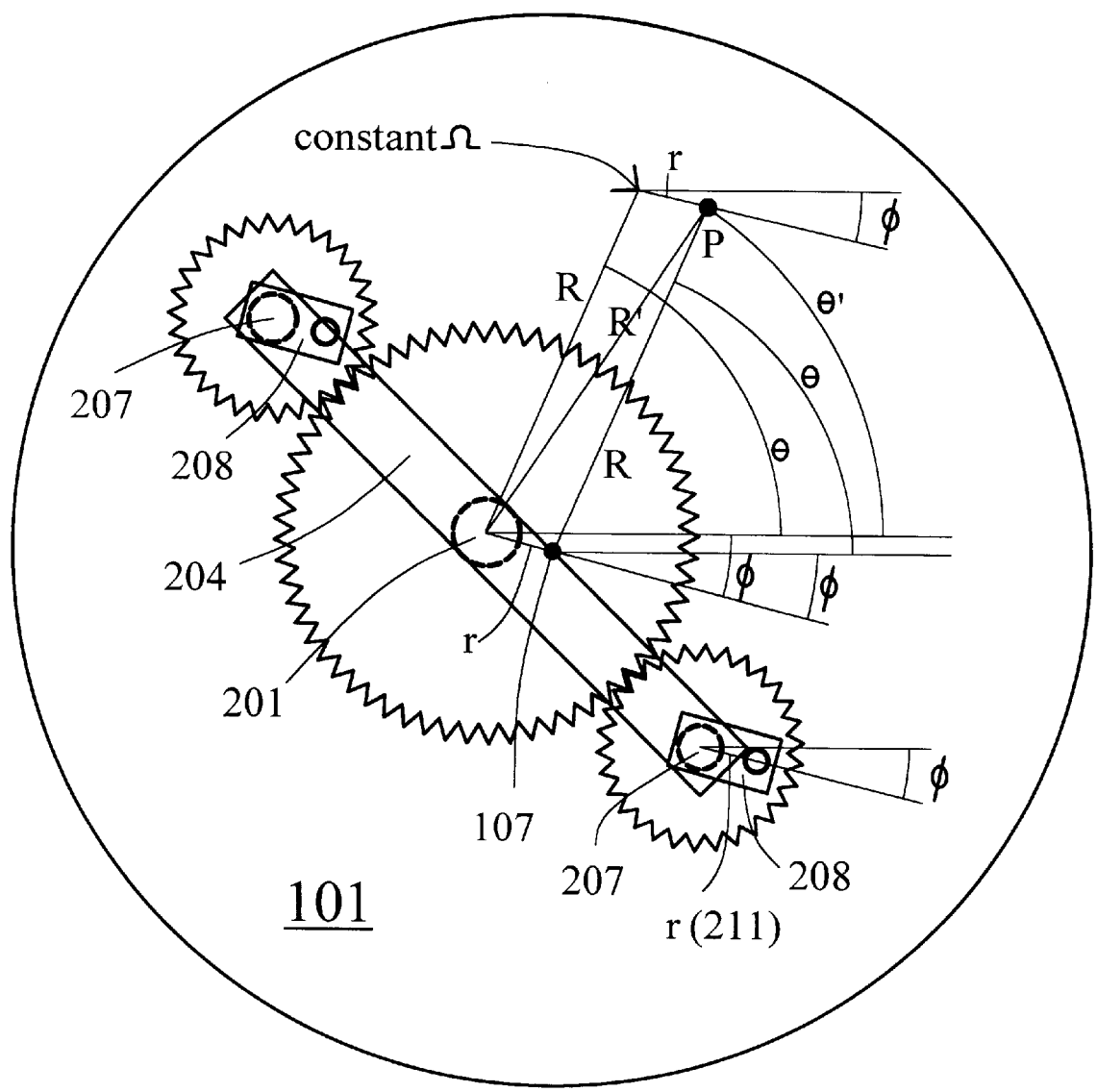
FIG. 3 shows the geometric constructions utilized to calculate the geometric trajectory over time of a particular "grit" of the sanding, buffing or polishing attachment in the preferred and alternate preferred embodiments of the invention.

FIG. 3 depicts an arbitrarily-selected position of operating attachment 101 during operation. Point P is a randomly-selected grit on operating attachment 101, R designates the radial distance of point P from the center 107 of operating attachment 101, and $\theta$ designates the angular orientation of point P with respect to operating attachment center 107. Recalling that the mechanism of FIG. 2 causes lateral driving connector 204 and hence secondary drive shafts 207 to rotate about the center of drive shaft 201 at the input frequency $\Omega$, it is apparent that the geometric (not physical) point labelled as "constant $\Omega$" in FIG. 3—constructed at the denoted distance r and angle $\phi$ with respect to P, is a point that rotates about the center of motion of drive shaft 201, at a constant frequency and speed given by input frequency $\Omega$. By geometric construction, this point of constant $\Omega$ is oriented at the same angle $\theta$ with respect to the center of drive shaft 201 as point P is oriented with respect to operating attachment center 107. Thus, point P moves about the center 107 of operating attachment 101, and the point labelled constant $\Omega$ also moves about the center of drive shaft 201, over time t, at the constant input frequency $\Omega$, with an angular orientation over time t given by:

$$\theta(t)=2\pi\Omega t. \quad (2)$$

Similarly, if $\phi$ designates the angular orientation of secondary driving bars 208 as shown, it is to be recalled that this orientation will also move with constant angular frequency $\omega$ as given eq. 1, that is:

$$\phi(t)=2\pi\omega t=2\pi G\Omega t=2\pi(N/n)\Omega t, \quad (3)$$

where $G=N/n$ is the gear gain ratio. Finally, r is used to designate the eccentric displacements 211 (see also FIG. 2) introduced by eccentric motion driving bar means 208.

With all of the above, one can readily calculate the (x,y) coordinates of point P with respect to the origin of rotation at the center of drive shaft 201 to be:

$$P(x,y)=P(R\cos\theta+r\cos\phi, R\sin\theta+r\sin\phi) \quad (4)$$

Thus, if R' designates the radial distance, and $\theta'$ designates the angular orientation, of point P with respect to the center of drive shaft 201, i.e., primary centerline 104 (rather than operating attachment center point 107), one can readily calculate that:

$$R'=sqrt\,[R^2+r^2+2Rr\cos(\theta-\phi)] \quad (5)$$

$$\sin\theta'(t) = \frac{(R\sin\theta + r\sin\phi)}{sqrt\,[R^2+r^2+2Rr\cos(\theta-\phi)]}. \quad (6)$$

To express these over time rather than in terms of angles, one merely substitutes eqs. (2) and (3) into eqs. (5) and (6) above, to yield:

$$R'(t)=sqrt\,[R^2+r^2+2Rr\cos(2\pi(G-1)\Omega t)] \quad (7)$$

$$\sin\theta'(t) = \frac{(R\sin 2\pi\Omega t + r\sin 2\pi G\Omega t)}{sqrt\,[R^2+r^2+2Rr\cos(2\pi(G-1)\Omega t)]}. \quad (8)$$

In contrast, for the prior art configuration of FIG. 1 (which is the limiting case in which r=0 in eqs. 7 and 8 above), R'(t)=R (constant radius), and $\theta'(t)=2\pi\Omega t$ (constant frequency).

Figure 4:
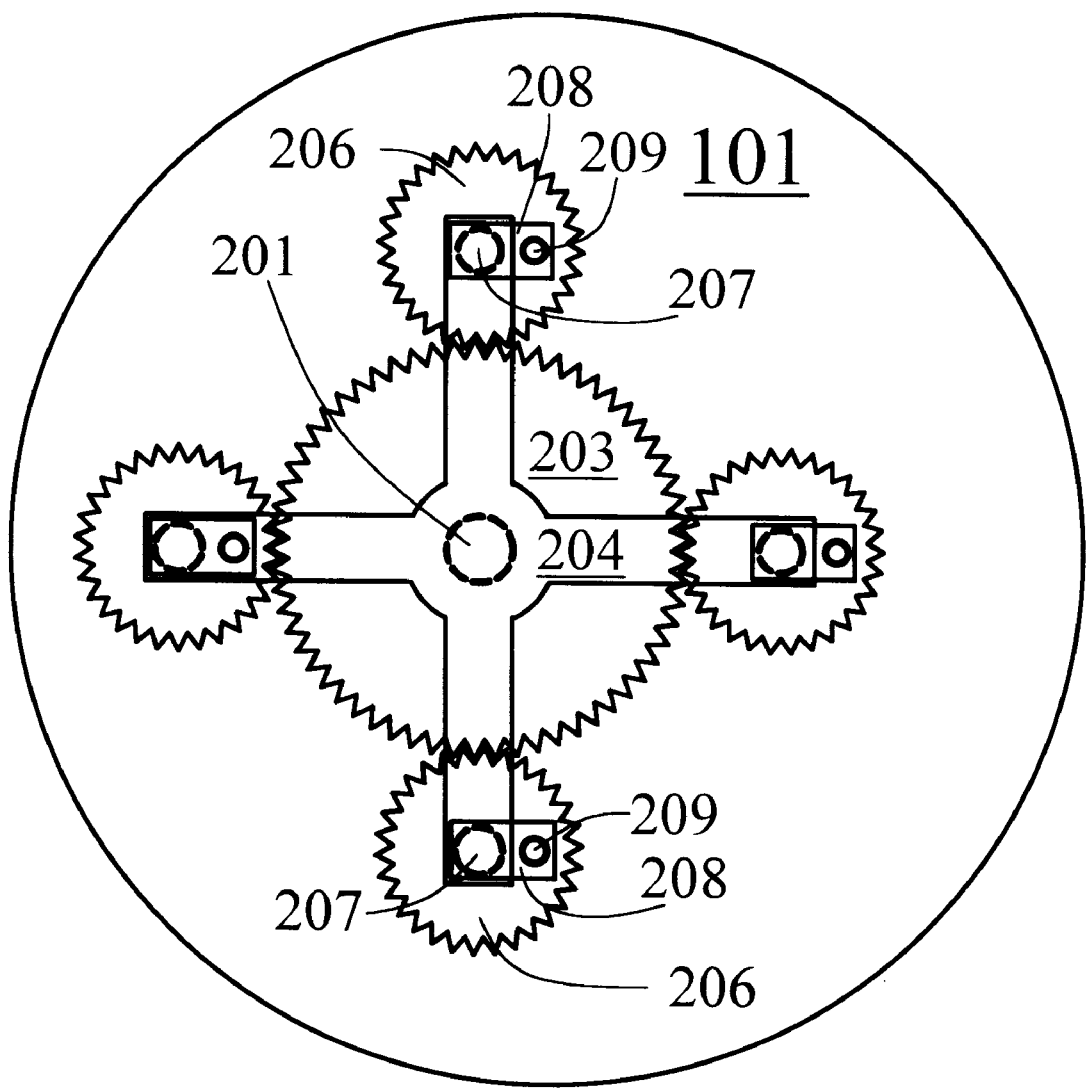
FIG. 4 shows a bottom-up plan view of a first alternative preferred embodiment of the invention, using four moving gears.

FIG. 4 shows a bottom-up plan view of a first alternative preferred embodiment of the invention. This embodiment is substantially the same as the preferred embodiment shown in FIG. 2, however, lateral driving connector 204 is now a driving "cross" as shown, attaching two additional rotating outer gears 206 with all other pertinent elements (e.g., 207, 208, 209) as shown, in the same manner as earlier discussed in connection with FIG. 2. Thus, while FIG. 2 illustrates a two-moving gear system, FIG. 4 illustrates a four-moving gear system. The use of four gears, rather than two, may provide a preferred weight balance for some applications. It should be apparent by contrasting FIG. 4 with FIG. 2 that the number of moving gears can readily be varied, and that the invention can be constructed even with but a single moving gear if needed, simply by altering the configuration of lateral driving connector 204. Thus, e.g., for a three-moving gear system, lateral driving connector 204 could have "triangular" arms each emanating about drive shaft 201 at substantially 120 degrees from one another. For five gears, an angle of substantially 72 degrees could separate the arms and the moving gear, etc. Any such variations in the number of moving gears would fall within the scope of this disclosure and its associated claims. Available physical space is the only limiting factor in choosing the number of moving gears. The motion of the device is still calculated according to eqs. 7 and 8, is unaffected by the number of moving gears, and depends only upon gear gain ratio G, eccentric displacement r, and input frequency $\Omega$.

Figure 5:
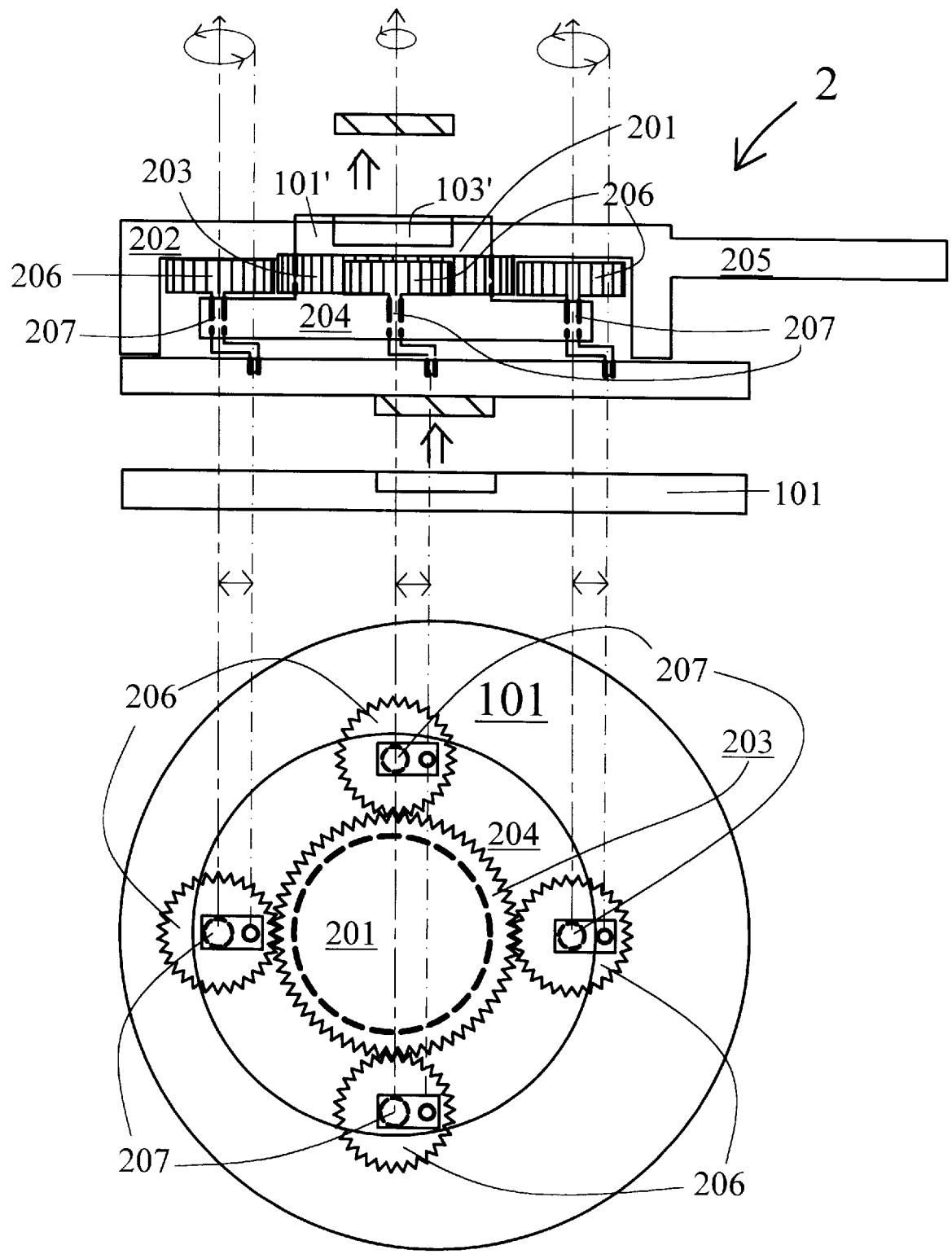
FIG. 5 shows side and bottom-up plan views of a second alternative preferred embodiment of the invention, using a driving disk.

FIG. 5 illustrates a second alternative preferred embodiment of the invention which is somewhat similar to FIG. 4, insofar as it is also a four-moving gear system. However, in this embodiment, lateral driving connector 204 is now a driving "disk" as shown, wherein secondary drive shafts 207 of rotating outer gears 206 pass through this driving disk-type lateral driving connector 204 at substantially 90 degrees from one another similarly to FIG. 4. (Again, one can use a different number of outer gears 206 within the scope of this disclosure and its associated claims.) Additionally, shaft driving disk 101' and drive shaft 201 are combined into a single indistinguishable component, wherein drive shaft 201 is substantially widened in relation to its width in FIG. 2, and affixes to lateral driving connector 204 along a much larger contact region as shown. The bore through the center of a non-rotating center gear 203 thus has a much larger radius to accommodate the wider shaft 201. Thicker, dashed lines continue to indicate regions where rotational bearings and/or sufficient lubrication is required to facilitate rotation.

In heavy use, the region where drive shaft 201 affixes to lateral driving connector 204 undergoes perhaps the highest degree of physical torque-related stress. In the configuration of FIG. 5, because drive shaft 201 affixes to lateral driving connector 204 along a much larger region, the chance that drive shaft 201 might break off from lateral driving connector 204 under a high-torque stress is greatly reduced. In addition, given the manner in which this overall rotary-motion conversion module 2 attaches to a sanding machine 7 (see FIGS. 7a and 7b), it is desirable to minimize the vertical height of module 2 as much as possible. The configuration of FIG. 5 helps to further achieve as "flat" a module 2 as possible.

It was noted in connection with FIGS. 2 and 3 (see also eqs. 1 and 3) that the eccentric motion frequency $\omega$ is stepped up by a factor of gear gain ratio G with respect to the input motor frequency $\Omega$, i.e., that $\omega=G\times\Omega$. In a configuration such as that shown in FIGS. 2, 4 and 5, with a single set of rotating outer gears 206 (regardless of how many gears comprise this set), then if N=N(203) is the number of teeth in non-rotating center gear 203, and n=N(206) is the number of teeth in each of the rotating outer gears 206 engaging center gear 203, then, as noted earlier, gear gain ratio G=N/n=N(203)/N(206). The motion of a single grit is then parameterized in terms of time t, using ratio G, by eqs. 7 and 8. In many cases, the gain ratio G achieved through the configuration of FIGS. 2, 4 and 5 is perfectly acceptable. However, if it is desired to greatly magnify the input frequency $\Omega$ into a very high eccentric motion frequency $\omega$ (for example, by a ratio of 10 to 1 or more), then a configuration such as that shown in FIG. 6, or something similar thereto that can be deduced by someone of ordinary skill in the mechanical arts, can be used to achieve this.

Figure 6:
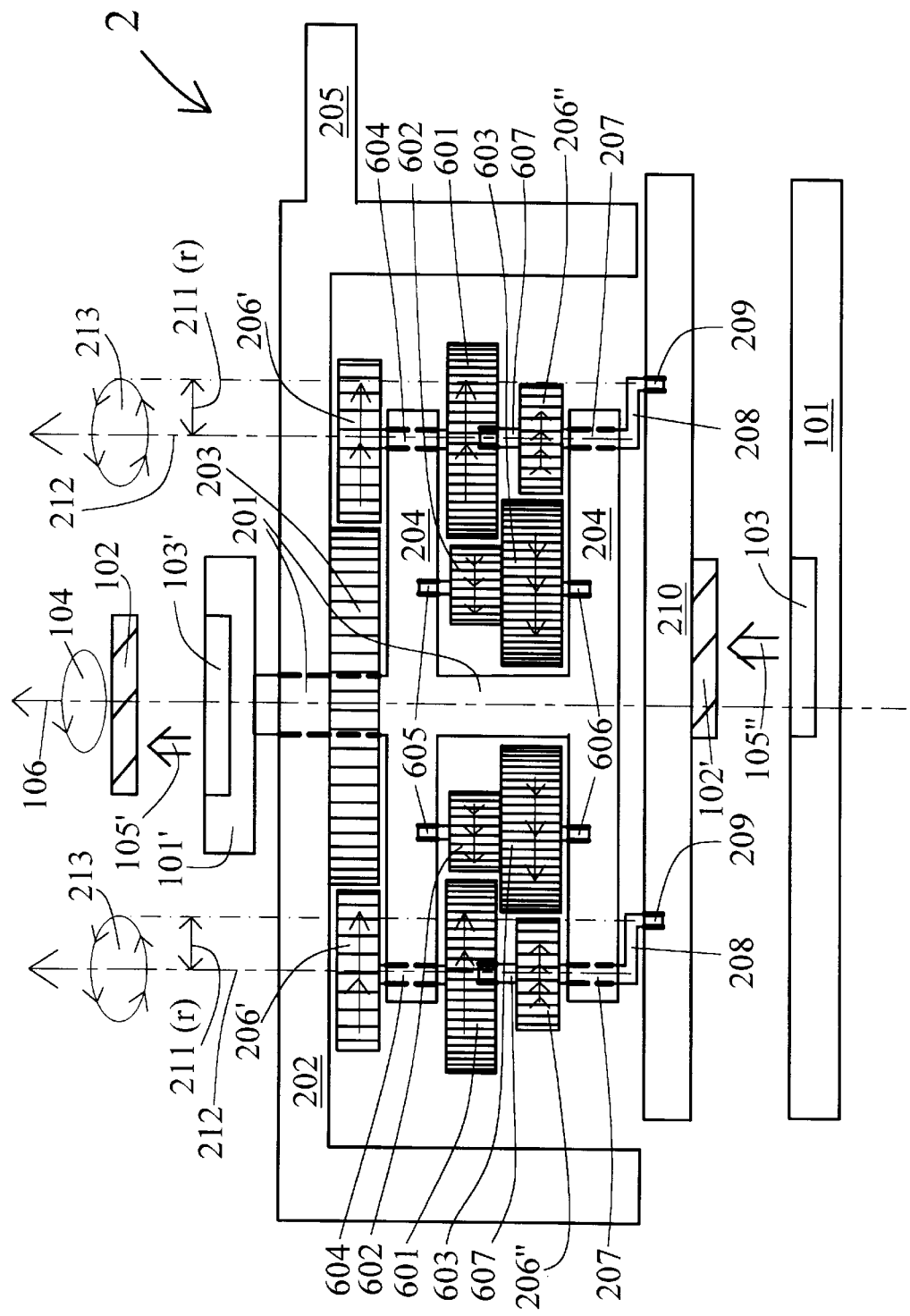
FIG. 6 shows a side plan view of a third alternative preferred embodiment of the invention which further increases the eccentric motion frequency of the invention.

FIG. 6 is illustrated based on the two outer gear, driving bar embodiment of FIG. 2. However, it would be obvious to someone of ordinary skill and is within the scope of this disclosure and its associated claims to apply the disclosure of FIG. 6 to work in connection with the four-gear embodiments of FIGS. 4 and 5 as well, or with obvious variations of the embodiments in FIGS. 2, 4 and 5 (e.g., one, three, five and six gear systems, etc.), subject only to physical space limitations.

FIG. 6 has all of the same elements and interactions as FIG. 2, and is driven and connected to the sanding machine 7 of FIG. 7a in precisely the same way. However, within the eccentric motion generating means, rotating outer gears 206 are replaced by stacked outer gears 206' and 206", and drive shaft 201 drives a lateral driving connector 204 with two parallel, vertically separated, laterally extending bars. If one started with FIG. 4 or 5 rather than FIG. 2, then lateral driving connector 204 would utilized parallel "crosses" (FIG. 4) or parallel "disks" instead. While FIG. 6 illustrates a two-layer stacking, this can be generalized by someone of ordinary skill to multiple layers as desired, or to other gear-increment configurations known in the art, subject only to space limitations.

When input rotary motion component 102 rotates drive shaft 201 as earlier described, the upper driving connector of 204 rotates upper outer gears 206' in precisely the same way that outer gears 206 are rotated in FIGS. 2, 4 and 5, with a stepped-up frequency ω given by eq. 1. However, secondary drive shafts 207, secondary driving bars 208 (which introduce the eccentric motion radius r (211) of eqs. 1–8) and eccentric motion drive shafts 209 are now affixed to lower outer gears 206", rather than outer gears 206 as in FIGS. 2, 4 and 5. Newly-introduced are first step-up gears 601, second step-up gears 602, and third step-up gears 603 (one for each outer gear pair 206' and 206"), which further multiply the rotational frequency imparted to secondary drive shafts 207, eccentric motion driving bars 208 and, particularly, eccentric motion drive shafts 209, as follows.

First step up gears 601 are immovably affixed to upper outer gears 206' via first step-up gear connectors 604 which run through the upper driving connector of 204 just as secondary drive shafts 207 runs through driving connector 204 in FIGS. 2, 4 and 5. (Thick, dotted lines again indicate rotational regions where bearings and/or sufficient lubrication are required.) Thus, first step up gears 601 will be imparted the same frequency of rotation as upper outer gears 206'. The direction of rotation (based on primary input rotation 104) is illustrated by the arrows, and the presence of two arrows on each of 206' and 601 indicates that these each rotate at the same frequency, but that this frequency is already stepped up from the input frequency θ indicated by the single arrow on 104. However, first step up gears 601 have a larger radius—and more importantly, more teeth—than upper outer gears 206'. The teeth of first step up gears 601 then engage teeth of second step-up gears 602, which have a smaller radius—and more importantly, less teeth—than first step up gears 601. Thus, second step-up gears 602 rotate at an even higher frequency (with opposite direction) than first step up gears 601, as illustrated by three arrows rather than two. Second step-up gears 602 are in turn attached directly to third step-up gears 603 with larger radius and more teeth, which by virtue of this attachment will rotate at the same frequency and in the same direction as second step-up gears 602. The combined element comprising 602 and 603 is fixed in place by upper step up attachments 605 and lower step up attachments 606, which respectively bore into and rotate freely within the upper and lower arms (or crosses for FIG. 4 and plates for FIG. 5) of driving connector 204, as shown.

Finally, the teeth of third step-up gears 603 directly engage the teeth of lower outer gears 206", which have a smaller radius and less teeth than third step-up gears 603. Thus, lower outer gears 206" will rotate at an even higher frequency (and reverse direction) than third step-up gears 603, as now illustrated by four arrows. Lower outer gears 206", of course, drive secondary drive shafts 207, eccentric motion driving bars 208 and eccentric motion drive shafts 209, and thus, the frequency of eccentric rotation 213 (also now showing four arrows) is the same as that of lower outer gears 206". Note that lower outer gears 206" are connected on top into a bore on the lower portion of first step up gears 601, via lower outer gear attachments 607 that rotate freely within this bore. On the bottom, lower outer gears 206" are connected through the lower arms (or crosses for FIG. 4 and plates for FIG. 5) of driving connector 204 with secondary drive shafts 207 just as in FIGS. 2, 4 and 5. The connections achieved by components 604, 605, 606, 607 and 207 ensure that the primary rotational frequency Ω (104) is preserved and passed through to operating attachment 101. The free rotation permitted by these same components, however, further enables the secondary (eccentric) frequency 213 to be vastly stepped up.

In particular, if N(203), N(206'), N(601), N(602), N(603) and N(206") denote the number of teeth for the particular gears associated with the parenthetical numbers, then the step up gear ratio G, which was G=N/n=N(203)/N(206) for FIGS. 2, 4 and 5, is, for FIG. 6, now given by:

$$G=[N(203)/N(206')]\times[N(601)/N(602)]\times[N(603)/N(206")] \qquad (9)$$

Thus, even with an approximate 2 to 1 ratio for each gear interaction, the eccentric frequency can be stepped up by a factor of $2^3=8$, and with a 3 to 1 ratio, this provides a factor of 27 to 1. Generally, with a G' to 1 ratio for each gear interaction, $G=G'^3$. The overall motion of a given "grit", however, is unchanged from that of eqs. 1–8; all that changes is the gear gain ratio G. Thus, the motion of a grit on operating attachment 101 in FIG. 6 is described simply by substituting eq. 9 for G into eqs. 1–8 as appropriate.

FIGS. 7a and 7b illustrates how rotary-motion conversion module 2 from any and all of FIGS. 2, 4, 5 and 6 attaches to sanding machine 7. For illustration, not limitation, module 2 of FIG. 2 is used in FIGS. 7a and 7b. FIG. 7a depicts a conventional sanding machine 7 with a bell 71 and a user control shaft 72. Illustrated with hidden lines within the sander is input rotary motion component 102 which was earlier illustrated at the top of each FIGS. 1, 2, 5 and 6. Rotary motion component 102 rotates in direction 104 at input frequency Ω as has been discussed all along, and is driven by a sander motor (not shown) in a manner well known in the art.

To modify a preexisting sanding machine 7 of input frequency Ω to accept rotary-motion conversion module 2, one first affixes a housing fixing device receptacle means 73 directly to the bell 71 as shown in both FIGS. 7a and 7b. Receptacle means 73 can be screwed into the bell, welded thereon, or attached (permanently or removably) in any other way that is known in the attachment arts. What is important, however, is that this attachment be very secure, and that it not come loose when subjected to the shear stresses that are introduced once conversion module 2 is attached to sanding machine 7 and operated.

Next, one inserts and locks (105') shaft driving disk 101' into input rotary motion component 102 via attachment receptacle 103', as first described in connection with FIG. 2, and later in connection with FIGS. 4, 5 and 6. At the same time, one locks housing fixing device 205 into housing fixing device receptacle means 73 as illustrated by arrow 74 in FIG. 7a, and as shown from bottom view in FIG. 7b. While housing fixing device 205 is illustrated herein as an attachment arm and housing fixing device receptacle means 73 is illustrated as a "U" to which housing fixing device 205 mates, any configuration is acceptable so long as these two components mate securely to one another without danger of becoming disconnected during operation, so that the fixed gear housing 202 does not rotate during operation. Finally, one chooses operating attachment 101 and attaches (105") it to pass-through rotary motion component 102' via rotary motion receptacle 103, as first discussed in connection with FIG. 2 and also later discussed for FIGS. 4, 5 and 6. At this point, conversion module 2 is fully ready for operation.

Because housing fixing device 205 is locked into housing fixing device receptacle means 73, fixed gear housing 202 and non-rotating center gear 203 which are integrally attached thereto are prevented from moving in a rotational direction. This enables the outer gears 206 (or 206' plus assorted step up gears from FIG. 6) to engage center gear 203 and produce the input frequency rotational motion with higher frequency eccentric oscillation described throughout this disclosure, and quantified by eqs. 7 and 8.

The various configurations described above can be used generally to convert a rotary motion input of given frequency $\Omega$ with no eccentricity, into rotary motion of the similar primary frequency $\Omega$, compounded with eccentric motion at a stepped-up frequency $\omega = G\Omega$, and described in detail by eqs. 7 and 8. This is true whether the subject invention is embodied as a module to be attached to a preexisting rotary motion machine (as presented in detail herein), or is embodied directly, non-removably, within a given machine as a way of generating high-frequency eccentric oscillations from a lower-frequency input rotation motor. Either alternative is encompassed by this disclosure and its associated claims. Of course, stepped-down eccentric motion can also be achieved if desired, by appropriate alteration of gear ratios.

While this discussion has referred generally to a sanding machine 7 as the device to which this invention is applied, it is understood that this invention can be used in connection with any rotary motion machine for which it is desired to introduce a (higher-frequency) eccentric oscillation. In all cases, what is needed are simply two points of contact with that machine. First, the fixed gear housing 202 must be fixed to some fixed (non-rotating) component of the machine via a housing fixing means that serves the function of component 205. Second, the drive shaft 201 must be affixed to (driven by) that component of the machine which generates the rotary motion, such as input rotary motion component 102. Thus, for example, a modified version of this device using all of the principles outlined herein can be non-rotatably fixed (205), say, to the arm of a standard power drill, with its drive shaft 201 driven by the rotational output of the drill. With, for example, an operating attachment 101 that is a buffer, and with pass-through rotary motion component 102' designed to accept drill attachments in the same manner that the drill itself normally accepts these, the drill can then be used to provide rotating buffing with eccentric oscillations. This also has application, for example, not limitation, to milling machines and low-speed grinding machines.

While the various embodiments of this invention have been illustrated using "toothed" wheels, it is fully understood that "friction" wheels are an obvious, equivalent substitute for these wheels, and that this substitution is included within the use of the terms "gear" and "wheel" as defined and utilized in this specification and its associated claims. Similarly, a wide variety of alterations and adjustments to the particular gear interactions illustrated herein, which would be obvious to someone of ordinary skill in the mechanical arts, are encompassed within the scope of this disclosure and its associated claims.

Finally, while the operating attachment 101 has been described herein generally as a sander, buffer or polisher, this is illustrative, not limiting. Any type of attachment that one ordinarily attaches to a rotating machine to produce a desired effect on a work product such as wood, stone, marble, metal, glass, ceramic, or any other substance to be finished, the work effect of which can be enhanced by introducing eccentric oscillations over the primary rotary motion, is considered within the scope of the invention as disclosed and claimed. Similarly, any application, whether to wood finishing, stone or marble finishing, metal, glass or ceramic finishing, or any other substance finishing, is also considered within the scope of this disclosure and its associated claims.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. An apparatus for converting rotary motion at a given input frequency $\Omega$ about a primary rotational center line, to rotary motion of the same frequency $\Omega$ about said primary rotational center line compounded with eccentric rotary motion at an eccentric motion frequency $\omega$ about at least one secondary rotational centerline, comprising:

non-rotating gear means affixed via a fixed gear housing and housing fixing means to a non-rotating component of a rotary motion machine;

drive shaft means connected to an input rotary motion component of said rotary motion machine, passing through said fixed gear housing from an input region of said fixed gear housing to an output region of said fixed gear housing, and by virtue of said connection to said input rotary motion component, rotating at said input frequency $\Omega$ about said primary rotational center line;

lateral driving connector means affixed to said drive shaft means proximate said output region of said fixed gear housing and thereby also rotating at said input frequency $\Omega$ about said primary rotational centerline;

eccentric motion generating means passing through said lateral driving connector means and thereby orbiting at said input frequency $\Omega$ about said primary rotational centerline, and further engaging said non-rotating gear means and thereby causing said eccentric motion generating means and secondary drive shaft means, eccentric motion driving bar means and eccentric motion drive shaft means thereof to also rotate at said eccentric motion frequency $\omega$ about said at least one secondary rotational centerline; and pass-through rotary motion component means connected to said eccentric motion drive shaft means, imparting both the orbit of said eccentric motion drive shaft means at said input frequency $\Omega$ about said primary rotational centerline and the rotation of said eccentric motion drive shaft means at said eccentric motion frequency $\omega$ about said at least one secondary rotational centerline, to an operating attachment attached to said pass-through rotary motion component means wherein, said apparatus is a modular device separate and distinct from said rotary motion machine;

said apparatus further comprises a conversion module receptacle of a form substantially equivalent to an attachment receptacle of said operating attachment;

said housing fixing means is so-fixed to said non-rotating component of said rotary motion machine;

said drive shaft means is affixed to said conversion module receptacle and is connected to said input rotary motion component of said rotary motion machine by mating said conversion module receptacle with said input rotary motion component in substantially the same manner that said attachment receptacle of said operating attachment is mated with said input rotary motion component when said modular device is not used;

said pass-through rotary motion component means is of a form substantially equivalent to said input rotary motion component of said rotary motion machine; and said attachment receptacle of said operating attachment is mated with said pass-through rotary motion component means in substantially the same manner that said attachment receptacle is mated with said input rotary motion component when said modular device is not used.

2. The apparatus of claim 1, wherein said lateral driving connector means is selected from the group consisting of a driving bar, a driving cross, and a driving disk.

3. The apparatus of claim 1, wherein:

said eccentric motion generating means further comprises at least one outer gear means affixed to said secondary drive shaft means and engaging said non-rotating gear means; and said secondary drive shaft means passes through said lateral driving connector; thereby causing said eccentric motion generating means and said secondary drive shaft means, eccentric motion driving bar means and eccentric motion drive shaft means thereof to so-rotate at said eccentric motion frequency ω about said at least one secondary rotational centerline.

4. The apparatus of claim 1, further comprising composite motion pass-through means, wherein said eccentric motion drive shaft means are tapped into said composite motion pass-through means to allow free rotational movement of said eccentric motion drive shafts within said composite motion pass-through means; and said pass-through rotary motion component is affixed to said composite motion pass-through means; thereby so-imparting motion comprising both said input frequency Ω about said primary rotational centerline and said eccentric motion frequency ω about said at least one secondary rotational centerline, to said operating attachment.

5. The apparatus of claim 1, wherein the motion of a selected point P of said operating attachment located at a radial distance R from a center of said operating attachment, over time t, is substantially given by:

$$R'(t) = sqrt\ [R^2 + r^2 + 2Rr\ \cos\ (2\pi(G-1)\Omega t)]$$

$$\sin\ \theta'(t) = \frac{(R\ \sin 2\pi\Omega t + r\ \sin 2\pi G\Omega t)}{sqrt\ [R^2 + r^2 + 2Rr\cos(2\pi(G-1)\Omega t)]},$$

where R'(t) designates a radial distance and θ'(t) designates an angular orientation of said point P with respect to said primary rotational centerline, where G designates a gear gain ratio of said eccentric motion generating means, and where r designates eccentric displacements introduced by said eccentric motion driving bar means.

6. An apparatus for converting rotary motion at a given input frequency Ω about a primary rotational center line, to rotary motion of the same frequency Ω about said primary rotational center line compounded with eccentric rotary motion at an eccentric motion frequency ω about at least one secondary rotational centerline, comprising:

non-rotating gear means affixed via a fixed gear housing and housing fixing means to a non-rotating component of a rotary motion machine;

drive shaft means connected to an input rotary motion component of said rotary motion machine, passing through said fixed gear housing from an input region of said fixed gear housing to an output region of said fixed gear housing, and by virtue of said connection to said input rotary motion component, rotating at said input frequency Ω about said primary rotational center line;

lateral driving connector means affixed to said drive shaft means proximate said output region of said fixed gear housing and thereby also rotating at said input frequency Ω about said primary rotational centerline;

eccentric motion generating means passing through said lateral driving connector means and thereby orbiting at said input frequency Ω about said primary rotational centerline, and further engaging said non-rotating gear means and thereby causing said eccentric motion generating means and secondary drive shaft means, eccentric motion driving bar means and eccentric motion drive shaft means thereof to also rotate at said eccentric motion frequency ω about said at least one secondary rotational centerline; and pass-through rotary motion component means connected to said eccentric motion drive shaft means, imparting both the orbit of said eccentric motion drive shaft means at said input frequency Ω about said primary rotational centerline and the rotation of said eccentric motion drive shaft means at said eccentric motion frequency ω about said at least one secondary rotational centerline, to an operating attachment attached to said pass-through rotary motion component means, wherein said eccentric motion generating means further comprises at least one step up gear to increase said eccentric motion frequency ω above what said frequency ω would be in the absence of said at least one step up gear.

7. The apparatus of claim 6, wherein said lateral driving connector means further comprises a plurality of parallel layers driving a plurality of stacked outer gears.

8. A rotary motion conversion adapter for adapting a preexisting rotary motion machine to compound eccentric rotary motion with input rotary motion produced by said machine, comprising:

a fixed gear housing;

housing fixing means;

non-rotating gear means affixed via said fixed gear housing and said housing fixing means to a non-rotating component of said rotary motion machine;

drive shaft means connected to an input rotary motion component of said rotary motion machine;

eccentric motion generating means, generating and adding said eccentric rotary motion to said input rotary motion, resulting in a compound motion;

pass-through rotary motion component means, comprising means for attaching an operating attachment thereto, and imparting said compound motion to said operating attachment via said pass-through rotary motion component means.

9. The adapter of claim 8, further comprising:

a conversion module receptacle affixed to said drive shaft means, of a form substantially equivalent to an attachment receptacle of said operating attachment; wherein:

said drive shaft means is connected to said input rotary motion component of said rotary motion machine by mating said conversion module receptacle with said input rotary motion component in substantially the same manner that said attachment receptacle of said operating attachment is mated with said input rotary motion component when said adapter is not used;

said attachment receptacle of said operating attachment is mated with said pass-through rotary motion component means in substantially the same manner that said attachment receptacle is mated with said input rotary motion component when said adapter is not used; and said pass-through rotary motion component means is of a form substantially equivalent to said input rotary motion component of said rotary motion machine.

10. The adapter of claim 8, wherein the motion of a selected point P of said operating attachment located at a radial distance R from a center of said operating attachment, over time t, is substantially given by:

$$R'(t) = sqrt\ [R^2 + r^2 + 2Rr\ \cos\ (2\pi(G-1)\Omega t)]$$

$$\sin\ \theta'(t) = \frac{(R\ \sin 2\pi\Omega t + r \sin 2\pi G \Omega t)}{sqrt\ [R^2 + r^2 + 2Rr \cos(2\pi(G-1)\Omega t)]},$$

where R'(t) designates a radial distance and θ'(t) designates an angular orientation of said point P with respect to a primary rotational centerline, where G designates a gear gain ratio of said eccentric motion generating means, and where r designates an eccentric displacement of said eccentric motion generating means.

11. A method for converting rotary motion at a given input frequency Ω about a primary rotational center line, to rotary motion of the same frequency Ω about said primary rotational center line compounded with eccentric rotary motion at an eccentric motion frequency ω about at least one secondary rotational centerline, comprising the steps of:

affixing non-rotating gear means via a fixed gear housing and housing fixing means to a non-rotating component of a rotary motion machine;

connecting drive shaft means to an input rotary motion component of said rotary motion machine, passing said drive shaft means through said fixed gear housing from an input region of said fixed gear housing to an output region of said fixed gear housing, and by virtue of said connection to said input rotary motion component, rotating said drive shaft means at said input frequency Ω about said primary rotational center line;

affixing lateral driving connector means to said drive shaft means proximate said output region of said fixed gear housing and thereby also rotating said lateral driving connector means at said input frequency Ω about said primary rotational centerline;

passing eccentric motion generating means through said lateral driving connector means and thereby orbiting said eccentric motion generating means at said input frequency Ω about said primary rotational centerline;

further engaging said eccentric motion generating means with said non-rotating gear means and thereby causing said eccentric motion generating means and secondary drive shaft means, eccentric motion driving bar means and eccentric motion drive shaft means thereof to also rotate at said eccentric motion frequency ω about said at least one secondary rotational centerline;

connecting pass-through rotary motion component means to said eccentric motion drive shaft means, thereby imparting both the orbit of said eccentric motion drive shaft means at said input frequency Ω about said primary rotational centerline and the rotation of said eccentric motion drive shaft means at said eccentric motion frequency ω about said at least one secondary rotational centerline, to said rotary motion component means; and attaching an operating attachment to said pass-through rotary motion component means, wherein a modular device separate and distinct from said rotary motion machine comprises said non-rotating gear means, fixed gear housing, housing fixing means, connecting drive shaft means, lateral driving connector means, eccentric motion generating means and pass-through rotary motion component means, comprising the further steps of:

so-fixing said housing fixing means to said non-rotating component of said rotary motion machine;

affixing said drive shaft means to a conversion module receptacle of a form substantially equivalent to an attachment receptacle of said operating attachment;

connecting said drive shaft means to said input rotary motion component of said rotary motion machine by mating said conversion module receptacle with said input rotary motion component in substantially the same manner that said attachment receptacle of said operating attachment is mated with said input rotary motion component when said modular device is not used;

mating said attachment receptacle of said operating attachment with said pass-through rotary motion component means in substantially the same manner that said attachment receptacle is mated with said input rotary motion component when said modular device is not used, wherein said pass-through rotary motion component means is of a form substantially equivalent to said input rotary motion component of said rotary motion machine.

12. The method of claim 11, wherein said lateral driving connector means is selected from the group consisting of a driving bar, a driving cross, and a driving disk.

13. The method of claim 11, said eccentric motion generating means further comprising at least one outer gear means affixed to said secondary drive shaft means, comprising the further steps of:

engaging said outer gear means with said non-rotating gear means;

passing said secondary drive shaft means through said lateral driving connector; and thereby causing said eccentric motion generating means and said secondary drive shaft means, eccentric motion driving bar means and eccentric motion drive shaft means thereof to so-rotate at said eccentric motion frequency ω about said at least one secondary rotational centerline.

14. The method of claim 11, further comprising the steps of:
   tapping said eccentric motion drive shaft means into composite motion pass-through means thereby allowing free rotational movement of said eccentric motion drive shafts within said composite motion pass-through means; and
   affixing said pass-through rotary motion component to said composite motion pass-through means; thereby
   so-imparting motion comprising both said input frequency Ω about said primary rotational centerline and said eccentric motion frequency ω about said at least one secondary rotational centerline, to said operating attachment.

15. The method of claim 11, said method resulting in the motion of a selected point P of said operating attachment located at a radial distance R from a center of said operating attachment, over time t, being substantially given by:

$$R'(t) = sqrt\ [R^2 + r^2 + 2Rr\ \cos\ (2\pi(G-1)\Omega t)]$$

$$\sin\ \theta'(t) = \frac{(R\ \sin 2\pi\Omega t + r \sin 2\pi G \Omega t)}{sqrt\ [R^2 + r^2 + 2Rr \cos(2\pi(G-1)\Omega t)]},$$

where R'(t) designates a radial distance and θ'(t) designates an angular orientation of said point P with respect to said primary rotational centerline, where G designates a gear gain ratio of said eccentric motion generating means, and where r designates eccentric displacements introduced by said eccentric motion driving bar means.

16. A method for converting rotary motion at a given input frequency Ω about a primary rotational center line, to rotary motion of the same frequency Ω about said primary rotational center line compounded with eccentric rotary motion at an eccentric motion frequency ω about at least one secondary rotational centerline, comprising the steps of:
   affixing non-rotating gear means via a fixed gear housing and housing fixing means to a non-rotating component of a rotary motion machine;
   connecting drive shaft means to an input rotary motion component of said rotary motion machine, passing said drive shaft means through said fixed gear housing from an input region of said fixed gear housing to an output region of said fixed gear housing, and by virtue of said connection to said input rotary motion component, rotating said drive shaft means at said input frequency Ω about said primary rotational center line;
   affixing lateral driving connector means to said drive shaft means proximate said output region of said fixed rear housing and thereby also rotating said lateral driving connector means at said input frequency Ω about said primary rotational centerline;
   passing eccentric motion generating means through said lateral driving connector means and thereby orbiting said eccentric motion generating means at said input frequency Ω about said primary rotational centerline;
   further engaging said eccentric motion generating means with said non-rotating gear means and thereby causing said eccentric motion generating means and secondary drive shaft means, eccentric motion driving bar means and eccentric motion drive shaft means thereof to also rotate at said eccentric motion frequency ω about said at least one secondary rotational centerline;
   connecting pass-through rotary motion component means to said eccentric motion drive shaft means, thereby imparting both the orbit of said eccentric motion drive shaft means at said input frequency Ω about said primary rotational centerline and the rotation of said eccentric motion drive shaft means at said eccentric motion frequency ω about said at least one secondary rotational centerline, to said rotary motion component means; and
   attaching an operating attachment to said pass-through rotary motion component means, said eccentric motion generating means further comprising at least one step up gear, comprising the further step of increasing said eccentric motion frequency ω using said at least one step up gear, to above what said frequency ω would be in the absence of said at least one step up gear.

17. The method of claim 16, said lateral driving connector means further comprising a plurality of parallel layers, comprising the further step of driving a plurality of stacked outer gears using said lateral driving connector means.

18. A method for adapting a preexisting rotary motion machine to compound eccentric rotary motion with input rotary motion produced by said machine, comprising the steps of:
   affixing non-rotating gear means via a fixed gear housing and housing fixing means to a non-rotating component of said rotary motion machine;
   connecting drive shaft means to an input rotary motion component of said rotary motion machine;
   generating and adding said eccentric rotary motion to said input rotary motion, using eccentric motion generating means, resulting in a compound motion;
   imparting said compound motion to pass-through rotary motion component means; and
   attaching an operating attachment to said pass-through rotary motion component means.

19. The method of claim 18, wherein said step of connecting said drive shaft means to said input rotary motion component of said rotary motion machine further comprises the steps of:
   affixing said drive shaft means to a conversion module receptacle of a form substantially equivalent to an attachment receptacle of said operating attachment; and
   connecting said drive shaft means to said input rotary motion component of said rotary motion machine by mating said conversion module receptacle with said input rotary motion component in substantially the same manner that said attachment receptacle of said operating attachment is mated with said input rotary motion component when said method is not used; and
   wherein the step of attaching an operating attachment to said pass-through rotary motion component means further comprises the step of:
   mating said attachment receptacle of said operating attachment with said pass-through rotary motion component means in substantially the same manner that said attachment receptacle is mated with said input rotary motion component when said method is not used, wherein said pass-through rotary motion component means is of a form substantially equivalent to said input rotary motion component of said rotary motion machine.

20. The method of claim 18, said method resulting in the motion of a selected point P of said operating attachment located at a radial distance R from a center of said operating attachment, over time t, being substantially given by:

$$R'(t) = sqrt\ [R^2 + r^2 + 2Rr\ \cos\ (2\pi(G-1)\Omega t)]$$

$$\sin\ \theta'(t) = \frac{(R\ \sin 2\pi\Omega t + r \sin 2\pi G \Omega t)}{sqrt\ [R^2 + r^2 + 2Rr \cos(2\pi(G-1)\Omega t)]},$$

where R'(t) designates a radial distance and θ'(t) designates an angular orientation of said point P with respect to a primary rotational centerline, where G designates a gear gain ratio of said eccentric motion generating means, and where r designates an eccentric displacement of said eccentric motion generating means.

\* \* \* \* \*